(12) United States Patent
Park et al.

(10) Patent No.: US 11,048,061 B2
(45) Date of Patent: Jun. 29, 2021

(54) ELECTRONIC DEVICE INCLUDING CAMERA MODULE

(71) Applicant: Samsung Electronics Co., Ltd., Gyeonggi-do (KR)

(72) Inventors: Jae Hyoung Park, Gyeonggi-do (KR); Jeong Won Lee, Gyeonggi-do (KR); Kyung Hoon Yoon, Gyeonggi-do (KR)

(73) Assignee: Samsung Electronics Co., Ltd

( * ) Notice: Subject to any disclaimer, the term of this patent is extended or adjusted under 35 U.S.C. 154(b) by 261 days.

(21) Appl. No.: 16/017,476

(22) Filed: Jun. 25, 2018

(65) Prior Publication Data

US 2019/0004282 A1 Jan. 3, 2019

(30) Foreign Application Priority Data

Jun. 28, 2017 (KR) .................. 10-2017-0081628

(51) Int. Cl.
*G02B 7/10* (2021.01)
*G02B 7/09* (2021.01)
(Continued)

(52) U.S. Cl.
CPC .............. *G02B 7/102* (2013.01); *G02B 7/09* (2013.01); *G06T 7/248* (2017.01);
(Continued)

(58) Field of Classification Search
CPC . G02B 7/10; G02B 7/09; G02B 7/102; G02B 7/105; G02B 7/28; G02B 7/285;
(Continued)

(56) References Cited

U.S. PATENT DOCUMENTS 8,289,438 B2 10/2012 Yeh
8,340,456 B1 12/2012 DaneshPanah et al.
(Continued)

FOREIGN PATENT DOCUMENTS

CN 103116739 5/2013
CN 106231177 12/2016
(Continued)

OTHER PUBLICATIONS

European Search Report dated Nov. 26, 2018 issued in counterpart application No. 18180360.2-1209, 14 pages.
(Continued)

*Primary Examiner* — Jie Lei
(74) *Attorney, Agent, or Firm* — The Farrell Law Firm, P.C.

(57) ABSTRACT

An electronic device is provided. The electronic device includes a camera including a lens unit and a lens driving unit and a processor configured to obtain a first image of an object from the camera, move the lens unit by a specified amount using the lens driving unit, obtain a second image of the object that corresponds to a position to which the lens unit is moved, determine a focus position for an image of the object based on a difference between the first image, the second image, and the specified amount of movement, determine an amount of movement for moving the lens unit to the focus position including determining a distance between the object and the lens unit and correcting the determined amount of movement based on the determined distance, and move the lens unit by the determined amount of movement using the lens driving unit.

3 Claims, 13 Drawing Sheets

(51) Int. Cl.
*H04N 5/232* (2006.01)
*G06T 7/246* (2017.01)

(52) U.S. Cl.
CPC ..... *H04N 5/23212* (2013.01); *H04N 5/23229* (2013.01); *H04N 5/232125* (2018.08)

(58) Field of Classification Search
CPC ...... G02B 7/38; H04N 5/232; H04N 5/23212; H04N 5/23232; H04N 5/23229; H04N 5/23296; H04N 5/232125; G06T 7/246; G06T 7/248; G03B 13/00; G03B 13/32; G03B 13/36
USPC .... 359/696–698, 694, 383, 824; 396/61, 89, 396/93, 128, 133, 459; 348/349–351
See application file for complete search history.

(56) References Cited

U.S. PATENT DOCUMENTS

| | | | |
|---|---|---|---|
| 8,737,756 | B2 | 5/2014 | DaneshPanah et al. |
| 9,264,606 | B2 | 2/2016 | Ishihara |
| 9,571,719 | B2 | 2/2017 | Ogura et al. |
| 9,781,344 | B2 | 10/2017 | Ishihara |
| 9,832,362 | B2 | 11/2017 | Ogura et al. |
| 2008/0297648 | A1 | 12/2008 | Furuki et al. |
| 2010/0073518 | A1 | 3/2010 | Yeh |
| 2013/0141538 | A1 | 6/2013 | DaneshPanah et al. |
| 2015/0092091 | A1 | 4/2015 | Ishihara |
| 2015/0138429 | A1 | 5/2015 | Ogura |
| 2016/0127648 | A1 | 5/2016 | Ishihara |
| 2016/0173762 | A1 | 6/2016 | Ogura et al. |
| 2019/0028629 | A1* | 1/2019 | Yoon .................. H04N 5/2351 |

FOREIGN PATENT DOCUMENTS

| | | |
|---|---|---|
| JP | 2002-072062 | 3/2002 |
| JP | 2011-070134 | 4/2011 |
| JP | 2015-072155 | 4/2015 |

OTHER PUBLICATIONS

Chinese Office Action dated Mar. 8, 2021 issued in counterpart application No. 201810678245.8, 23 pages.

* cited by examiner

ELECTRONIC DEVICE INCLUDING CAMERA MODULE

CROSS-REFERENCE TO RELATED APPLICATION(S)

This application is based on and claims priority under 35 U.S.C. § 119(a) to Korean Patent Application Serial No. 10-2017-0081628, which was filed on Jun. 28, 2017 in the Korean Intellectual Property Office, the disclosure of which is incorporated by reference herein its entirety.

BACKGROUND

1. Field

The disclosure relates, generally, to an electronic device with camera functions, and more particularly, to an electronic device that includes a camera module that is configured for focus adjustment or distance information acquisition.

2. Description of Related Art

Conventional camera modules that are configured for use with electronic devices may include a driving unit for moving a plurality of lenses (a lens unit), and may perform an auto focus (AF) function while moving the lenses through the driving unit.

The camera module may perform the auto focus function by using a contrast AF method, a phase difference AF method, a depth from defocus (DFD) method, or the like.

The above information is presented as background information only to assist with an understanding of the present disclosure. No determination has been made, and no assertion is made, as to whether any of the above might be applicable as prior art with regard to the present disclosure.

SUMMARY

According to the contrast AF method, a camera module may obtain the contrast of an image signal generated by an image sensor while taking an image by changing a position of lenses (e.g., a lens unit) and may focus the lenses by adjusting the lenses to a position where the contrast has a peak value. The camera module of a contrast AF type, however, may not determine a moving direction of the lenses based on the contrast and, therefore, may have a relatively low focus adjustment speed.

According to the phase difference AF method, a camera module may include a sensing element separate from an image sensor, and may detect a focus position by using a phase difference of light applied to the sensing element. The camera module of a phase difference AF type may determine a moving direction of lenses based on the phase difference and, therefore, may have a relatively high focus adjustment speed. However, the camera module may have a large volume and may have difficulty in detecting the focus during continuous photographing since the camera module requires a mirror.

According to the DFD method, a camera module may obtain two images at different lens positions and may identify a focus position by checking point spread function corresponding to a defocus magnitude change of the two images (a DFD operation). However, the accuracy of the focus position determined by the DFD operation may be low since a movement of lenses is not linearly proportional to a defocus magnitude.

Accordingly, the camera module of a DFD type may perform focus adjustment by using the contrast AF method, thereby increasing the accuracy of the DFD operation. For example, the camera module may move the lenses in a moving direction of a lens close to the focus position determined by using the DFD operation, and may adjust the focus position by using contrast. In this case, the camera module may increase the accuracy of the focus adjustment, but the focus adjustment speed may become lower. To increase the speed in performing the DFD AF, it is necessary to ensure that the accuracy of the focus position determined by the DFD operation is not compromised or diminished.

The disclosure has been made to address at least the disadvantages described above and to provide at least the advantages described below.

Accordingly, an aspect of the disclosure provides a camera module, an electronic device, and a focus adjustment method for reducing a focus adjustment error of a focus adjustment method using a DFD operation.

In accordance with an aspect of the disclosure, there is provided an electronic device. The electronic device includes a camera including a lens unit and a lens driving unit configured to move the lens unit; and a processor configured to obtain a first image of an object from the camera, move the lens unit by a specified amount using the lens driving unit, obtain a second image of the object that corresponds to a position to which the lens unit is moved, determine a focus position for an image of the object based on a difference between the first image, the second image, and the specified amount of movement, determine an amount of movement for moving the lens unit to the focus position including determining a distance between the object and the lens unit and correcting the determined amount of movement based on the determined distance, and move the lens unit by the determined amount of movement using the lens driving unit.

In accordance with aspect of the disclosure, there is provided an electronic device. The electronic device includes a camera including a lens unit and a lens driving unit configured to move the lens unit, wherein the lens driving unit has a difference between a first distance by which the lens unit is moved to cause a specified defocus when the lens unit is located at a first position and a second distance by which the lens unit is moved to cause the specified defocus when the lens unit is located at a second position, in at least one section of the entire route along which the lens unit is moved and a processor configured to obtain a first image of an object from the camera, move the lens unit by a specified amount of movement using the lens driving unit, obtain a second image of the object that corresponds to a position to which the lens unit is moved, determine a focus position for an image of the object based on a difference between the first image and the second image and the specified amount of movement, determine an amount of movement for moving the lens unit to the focus position and correct the amount of movement based on the difference between the first distance and the second distance, when determining an amount of movement when the focus position is included in the at least one section of the route, and move the lens unit by the corrected amount of movement using the lens driving unit.

In accordance with an aspect of the disclosure, there is provided a camera module. The camera module includes a lens unit including a plurality of lenses, an image sensor on which an image corresponding to light passing through the plurality of lenses is focused, a driving unit configured to adjust a position of the lens unit, wherein the driving unit is configured to move the position of the lens unit by a first distance unit in at least one section of the entire route along which the lens unit is moved and to move the position of the lens unit by at least one second distance unit in at least one other section of the entire route, and the first distance unit and the second distance unit are determined such that defocus of the image formed on the image sensor is changed by a specified magnitude, or in a specified error range from the specified magnitude, a processor configured to store a first point spread function generated based on a defocus magnitude of an image having obtained a point light source spaced apart from the lens unit according to a characteristic of the lens unit, obtain a first image of an object at a first position of the lens unit, move the lens unit by a specified amount of movement using the driving unit and obtain a second image of the object at a second position of the lens unit, calculate a defocus position for the external object by comparing a defocus magnitude change of the first point spread function, the specified amount of movement, and a defocus magnitude change between the first image and the second image, determine an amount of movement for moving the lens unit from the calculated defocus position to a focus position using the driving unit, and move the lens unit by the determined amount of movement.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
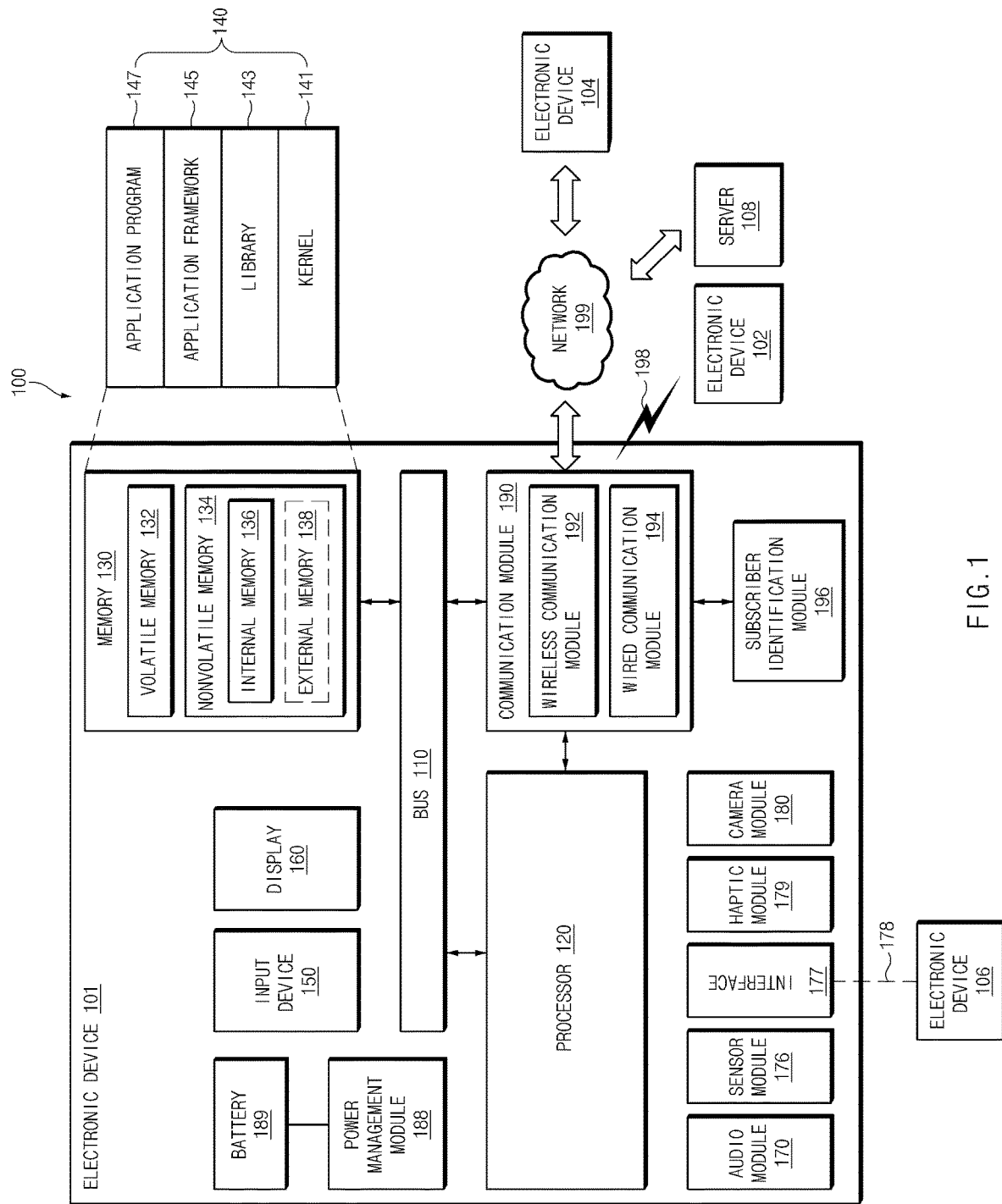
FIG. 1 is a diagram of an electronic device in a network environment, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

FIG. 1 is a diagram of an electronic device 101 in a network environment 100, according to an embodiment.

The electronic device 100 according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic 101 device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device 101 may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things device (IoT) (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device 101 may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, the electronic device 101 will be described with reference to the accompanying drawings. In the disclosure, the term "user" may indicate a person using the electronic device 101 or a device (e.g., an artificial intelligence electronic device) using the electronic device 101.

Referring to FIG. 1, under the network environment 100, the electronic device 101 may communicate with an electronic device 102 through local wireless communication 198 or may communicate with an electronic device 104 or a server 108 through a network 199. According to an embodiment, the electronic device 101 may communicate with the electronic device 104 through the server 108.

According to an embodiment, the electronic device 101 may include a bus 110, one or more processors 120 a memory 130, an input device 150 (e.g., a microphone or a mouse), a display 160, an audio module 170, a sensor module 176, an interface 177, a haptic module 179, a camera module 180, a power management module 188, a battery 189, a communication module 190, and a subscriber identification module (SIM) 196. According to an embodiment, the electronic device 101 may omit at least one (e.g., the display 160 or the camera module 180) of the above-described elements or may further include other element(s).

For example, the bus 110 may interconnect the above-described elements 120 to 190 and may include a circuit for conveying signals (e.g., a control message or data) between the above-described elements. According to an embodiment, the processor 120 may include one or more of a central processing unit (CPU), an application processor, a graphic processing unit (GPU), a camera image signal processor of a camera or a communication processor (CP). The processor 120 may be implemented with a system on chip (Soc) or a system in package (SiP). The processor 120 may drive an operating system (OS) or an application to control at least one of another element (e.g., hardware or software element) connected to the processor 120 and may process and compute various data. The processor 120 may load an instruction or data, which is received from at least one of other elements (e.g., the communication module 190), into a volatile memory 132 to process the instruction or data and may store the process result data into the nonvolatile memory 134.

The memory 130 may include, for example, a volatile memory 132 or a nonvolatile memory 134. The volatile memory 132 may include, for example, a random access memory (RAM) (e.g., a dynamic random access memory (DRAM), a static RAM (SRAM), or a synchronous dynamic RAM (SDRAM)). The nonvolatile memory 134 may include, for example, one-time programmable read-only memory (OTPROM), programmable read-only memory (PROM), an erasable programmable read-only memory (EPROM), an electrically erasable programmable read-only memory (EEPROM), a mask ROM, a flash ROM, a flash memory, a hard drive, or a solid-state drive (SSD). In addition, the nonvolatile memory 134 may be configured in the form of an internal memory 136 or the form of an external memory 138 which is available through connection only if necessary, according to the connection forms of the electronic device 101. The external memory 138 may further include a flash drive such as compact flash (CF), secure digital (SD), micro secure digital (micro-SD), mini secure digital (mini-SD), extreme digital (xD), a multimedia card (MMC), or a memory stick. The external memory 138 may be operatively or physically connected with the electronic device 101 in a wired manner (e.g., a cable or a universal serial bus (USB)) or a wireless (e.g., BT) manner.

For example, the memory 130 may store, for example, at least one different software element, such as an instruction or data associated with the program 140, of the electronic device 101. The program 140 may include, for example, a kernel 141, a library 143, an application framework 145 or an application program (application) 147.

The input device 150 may include a microphone, a mouse, or a keyboard. According to an embodiment, the keyboard may include a keyboard physically connected or a keyboard virtually displayed through the display 160.

The display 160 may include a display, a hologram device or a projector, and a control circuit to control a relevant device. The screen may include, for example, a liquid crystal display (LCD), a light emitting diode (LED) display, an organic LED (OLED) display, a plastic OLED (POLED), a microelectromechanical systems (MEMS) display, or an electronic paper display. According to an embodiment, the display may be flexibly, transparently, or wearably implemented. The display may include a touch circuitry, which is able to detect a user's touch input such as a gesture input, a proximity input, or a hovering input or a pressure sensor (a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 101.

The audio module 170 may convert, for example, from a sound into an electrical signal or from an electrical signal into the sound. According to an embodiment, the audio module 170 may acquire sound through the input device 150 (e.g., a microphone) or may output sound through an output device (e.g., a speaker or a receiver) included in the electronic device 101, the electronic device 102 (e.g., a wireless speaker or a wireless headphone) or an electronic device 106 (e.g., a wired speaker or a wired headphone) connected with the electronic device 101.

The sensor module 176 may measure or detect, for example, an internal operating state (e.g., power or temperature) or an external environment state (e.g., an altitude, a humidity, or brightness) of the electronic device 101 to generate an electrical signal or a data value corresponding to the information of the measured state or the detected state. The sensor module 176 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor, a temperature sensor, a humidity sensor, an illuminance sensor or an UV sensor. The sensor module 176 may further include a control circuit for controlling at least one or more sensors included therein. According to an embodiment, the sensor module 176 may be controlled by using the processor 120 or a processor (e.g., a sensor hub) separate from the processor 120. When a separate processor (e.g., a sensor hub) is used, while the processor 120 is a sleep state, the separate processor may operate without awakening the processor 120 to control at least a portion of the operation or the state of the sensor module 176.

According to an embodiment, the interface 177 may include a high definition multimedia interface (HDMI), a USB, an optical interface, a recommended standard 232 (RS-232), a D-subminiature (D-sub), a mobile high-definition link (MHL) interface, a SD card/MMC (multi-media card) interface, or an audio interface. A connector 178 may physically connect the electronic device 101 and the electronic device 106. According to an embodiment, the connector 178 may include, for example, a USB connector, an SD card/MMC connector, or an audio connector (e.g., a headphone connector).

The haptic module 179 may convert an electrical signal into mechanical stimulation (e.g., vibration or motion) or into electrical stimulation. For example, the haptic module 179 may apply tactile or kinesthetic stimulation to a user. The haptic module 179 may include, for example, a motor, a piezoelectric element, or an electric stimulator.

The camera module 180 may capture, for example, a still image and a moving picture. According to an embodiment, the camera module 180 may include at least one lens (e.g., a wide-angle lens and a telephoto lens, or a front lens and a rear lens), an image sensor, an image signal processor, or a flash (e.g., a light emitting diode or a xenon lamp).

The power management module 188, which manages the power of the electronic device 101, may constitute at least a portion of a power management integrated circuit (PMIC).

The battery 189 may include a primary cell, a secondary cell, or a fuel cell and may be recharged by an external power source to supply power to at least one element of the electronic device 101.

The communication module 190 may establish a communication channel between the electronic device 101 and the first external electronic device 102, the second external electronic device 104, or the server 108. The communication module 190 may support wired communication or wireless communication through the established communication channel. According to an embodiment, the communication module 190 may include a wireless communication module 192 or a wired communication module 194. The communication module 190 may communicate with the first external electronic device 102, the second external electronic device 104 or the server 108 through the network 198 (e.g. a wireless local area network (LAN) such as BT or infrared data association (IrDA)) or the network 199 (e.g., a wireless wide area network such as a cellular network) through a relevant module among the wireless communication module 192 or the wired communication module 194.

The wireless communication module 192 may support, for example, cellular communication, local wireless communication, and global navigation satellite system (GNSS) communication. The cellular communication may include, for example, long-term evolution (LTE), LTE advance (LTE-A), code division multiple access (CMA), wideband CDMA (WCDMA), universal mobile telecommunications system (UMTS), wireless broadband (WiBro), or global system for mobile communications (GSM). The local wireless communication may include Wi-Fi, WiFi Direct, light fidelity, BT, BT low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou) or Galileo, the European global satellite-based navigation system, or the like. In the disclosure, GPS and GNSS may be interchangeably used.

According to an embodiment, when the wireless communication module 192 supports cellular communication, the wireless communication module 192 may, for example, identify or authenticate the electronic device 101 within a communication network using the SIM 196. According to an embodiment, the wireless communication module 192 may include the processor 120 (e.g., an application processor and a separate communication processor (CP)). The communication processor may perform at least a portion of functions associated with at least one of elements 110 to 196 of the electronic device 101 in replace of the processor 120 when the processor 120 is in an inactive (sleep) state, and together with the processor 120 when the processor 120 is in an active state. According to an embodiment, the wireless communication module 192 may include a plurality of communication modules, each supporting only a relevant communication scheme among cellular communication, short-range wireless communication, or a GNSS communication scheme.

The wired communication module 194 may include, for example, a local area network (LAN) service, a power line communication, or a plain old telephone service (POTS).

The first network 198 may employ WiFi direct or BT for transmitting or receiving instructions or data through wireless direct connection between the electronic device 101 and the first external electronic device 102. The second network 199 may include a telecommunication network (e.g., a computer network such as a LAN or a WAN, the internet or a telephone network) for transmitting or receiving instructions or data between the electronic device 101 and the second electronic device 104.

According to an embodiment, the instructions or the data may be transmitted or received between the electronic device 101 and the second external electronic device 104 through the server 108 connected with the second network. Each of the first and second external electronic devices 102 and 104 may be a device of which the type is different from or the same as that of the electronic device 101. According to an embodiment, all or a part of operations that the electronic device 101 will perform may be executed by the electronic devices 102 and 104 or the server 108. According to an embodiment, when the electronic device 101 executes any function or service automatically or in response to a request, the electronic device 101 may not perform the function or the service internally, but may alternatively or additionally transmit requests for at least a part of a function associated with the electronic device 101 to the electronic device 102 or 104 or the server 108. The electronic device 102 or 104 or the server 108 may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
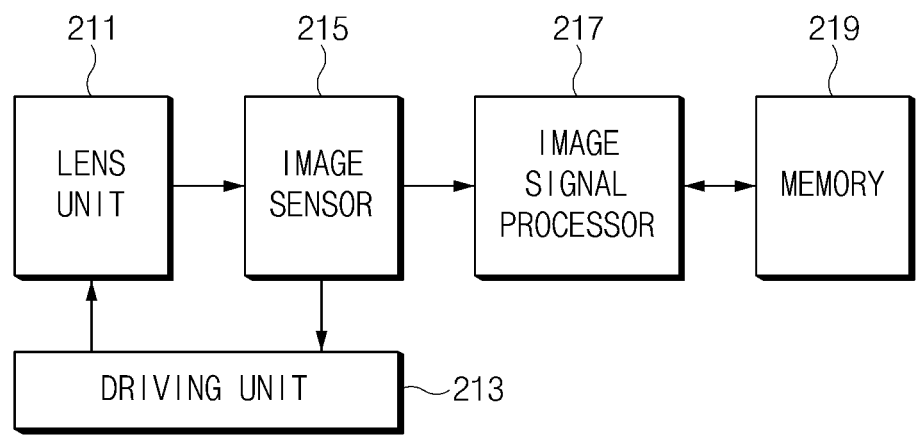
FIG. 2 is a diagram of a camera module, according to an embodiment.

FIG. 2 is a diagram of a camera module, according to an embodiment.

Referring to FIG. 2, a camera module 210 includes a lens unit 211, an image sensor 215, a driving unit 213, and a memory 219.

According to an embodiment, the lens unit 211 may include a plurality of lenses. The plurality of lenses may be configured as a group of lenses. The lens unit 211 may be fixed to a body tube, with a constant distance between the lenses. The lens unit 211 may be moved together with the body tube along an optical axis by a force exerted by the driving unit 213. For example, the lens unit 211 may be moved in a first direction toward a subject, or in a second direction away from the subject, depending on the direction of the force exerted by the driving unit 213.

According to an embodiment, the image sensor 215 may output an image signal obtained by converting light passing through the lens unit 211 into an electrical signal. The image sensor 215 may be a sensor, such as a charge-coupled device (CCD), a complementary metal-oxide-semiconductor (CMOS), or the like. The image signal may be an image formed on the image sensor 215.

According to an embodiment, the driving unit 213 may move the lens unit 211 along the optical axis according to an instruction of the image signal processor 217. The driving unit 213 may receive a control signal from the image signal processor 217 and may move the lens unit 211 along the optical axis in a direction corresponding to the control signal, i.e., in the first direction toward the subject or in the second direction away from the subject.

In an embodiment, the driving unit 213 may move the lens unit 211 by an amount of movement that corresponds to the control signal. The driving unit 213 may move the lenses by a unit distance at a time over a total distance that the lenses are capable of moving along the optical axis for focus adjustment. The total distance may be divided into 1024 ($=2^{10}$) unit distances or 512 ($=2^9$) unit distances. At least some of the unit distances may be the same as one another, and the others may differ from one another. The driving unit 213 may move the lens unit 211 by a first unit distance at a time in at least one section of the entire route along which the lens unit 211 is movable, and may move the lens unit 211 by at least one second unit distance at a time in at least one other section of the entire route. The first unit distance and the second unit distance may be determined such that a defocus magnitude change of an image formed on the image sensor 215 due to a movement of the lens unit 211 is constant or within a specified error range.

In an embodiment, the control signal may be a pulse signal. When a pulse signal is applied as the control signal, the driving unit 213 may move the lens unit 211 by an amount of movement that corresponds to the number of pulses. Hereinafter, for illustrative purposes, the control signal is assumed to be a pulse signal, and the driving unit 213 moves the lens unit 211 by the number of pulses.

According to an embodiment, the memory 219 may store specified point spread function (first point spread function) corresponding to a specified distance. Each position of the lens unit 211 may include all positions where the lens unit 211 is able to be moved by a force of the driving unit 213 and a movement margin interval. The specified point spread function may include a plurality of degrees of spreading of a point. Each degree of spreading of a point is modeled to correspond to a defocus magnitude of an image that obtained a point light source (unsaturated), which is spaced apart from the lens unit 211 by the specified distance from the image sensor 215 for each position of the entire route along which the lens unit 211 is movable. Alternatively, the specified point spread function may include a plurality of degrees of spreading of a point. Each degrees of spreading of a point is modeled to correspond to a defocus magnitude of a point light source which is spaced by the specified distance apart from each position where the lens unit 211 is able to be moved, through using a mathematical formula based on design data of the lens unit 211. The specified distance may be a distance of the subject that is able to be photographed by the camera module 210 and may be, e.g., 2 m. The intervals (or the defocus magnitude changes) between the point spread function may be constant or nearly similar to one another.

In an embodiment, the magnitudes (or intervals) of the point spread function may be differently calculated depending on at least one of each position of the lenses or a distance of the subject. For example, the magnitudes of the point spread function may be smallest when the lenses are at a focus position and may relatively increase as the lenses are away from the focus position. In another example, the magnitudes of point spread function identified from two images taken when the lens unit 211 is located at the same position may be relatively small when the subject is relatively close to the lens unit 211 and may be relatively large when the subject is relatively far away from the lens unit 211. The non-uniform magnitude change of the point spread function depending on the distance between the lens unit 211 and the subject and the current position of the lens unit 211 may lead to an error in the focus position according to a DFD operation.

To prevent this, data for correcting the focus position according to the DFD operation may be additionally stored in the memory 219.

For example, the memory 219 may additionally store other point spread function corresponding to other specified distance from the lens unit 211. The other specified point spread function (e.g., second point spread function) may include a plurality of degrees of spreading of a point. Each degrees of spreading of a point is modeled to correspond to a defocus magnitude of an image that obtained a point light source which is spaced apart from the lens unit 211 by the other specified distance from the image sensor 215 for each position of the entire route along which the lens unit 211 is movable.

Alternatively, the other specified point spread function may include a plurality of degrees of spreading of a point. Each degrees of spreading of a point is modeled to correspond to a defocus magnitude relevant to a point light source which is spaced by the other specified distance apart from each position where the lens unit 211 is able to be moved, through using a mathematical formula based on design data of the lens unit 211. The other specified point spread function may be configured as a plurality of sets depending on a distance of the subject. For example, the other specified point spread function may include a plurality of point spread functions respectively corresponding to a plurality of distances of the subject.

The memory 219 may additionally store a magnitude ratio between the specified point spread function and the other specified point spread function. The magnitude ratio may be determined through an experiment of identifying a defocus magnitude change depending on a distance of the subject while changing the distance of the subject in the state in which the position of the lens unit 211 is fixed. The magnitude ratio may be stored in a lookup table form in the memory 219.

According to an embodiment, the memory 219 may store an amount of movement that corresponds to a specified distance of the subject and each position of the lens unit 211. The amount of movement may be determined such that a defocus change of a specified magnitude is generated by a unit movement of the lens unit 211 for at least the specified distance of the subject. In this case, the amount of movement may be stored in a lookup table form.

The image signal processor 217 may include a central processing unit (CPU), a graphics processing unit (GPU), a microprocessor, an application processor, an application specific integrated circuit (ASIC), field programmable gate arrays (FPGA), and an image signal processor and may have a plurality of cores.

According to an embodiment, the image signal processor 217 may extract a region of interest (or a subject) from an image formed on the image sensor 215 and may identify a defocus magnitude of the extracted region of interest. The image signal processor 217 may identify the defocus magnitude of the region of interest while tracking the region of interest. In this process, the image signal processor 217 may apply a control signal to the driving unit 213 to adjust the position of the lens unit 211.

According to an embodiment, the image signal processor 217 may obtain two images of a subject formed on the image sensor 215 at different lens positions. For example, the image signal processor 217 may locate the lens unit 211 at a first position and may obtain a first image of the subject formed on the image sensor 215. In addition, the image signal processor 217 may move the lens unit 211 by a specified amount of movement to locate the lens unit 211 at a second position and may obtain a second image of the subject formed on the image sensor 215.

According to an embodiment, the image signal processor 217 may calculate a defocus position of a region of interest by performing a DFD operation based on the specified amount of movement and a difference between the first and second images by using specified point spread function. Since the defocus position corresponds to the distance from the current position of the lens unit 211 to the focus position, the image signal processor 217 may determine an amount of movement from the calculated defocus position to the focus position.

According to an embodiment, the image signal processor 217 may determine the distance between the lens unit 211 and the subject by using the defocus position and may correct the determined amount of movement, based on the determined distance.

According to an embodiment, the image signal processor 217 may correct an error in the amount of movement due to a magnitude difference between the specified point spread function used in the DFD operation and point spread function corresponding to the determined distance.

According to an embodiment, the image signal processor 217 may search the memory 219 for other point spread function corresponding to the determined distance and may re-determine an amount of movement by using the discovered point spread function. The image signal processor 217 may supply a control signal corresponding to the determined amount of movement to locate the lens unit 211 at a third position, may obtain a third image of the subject formed on the image sensor 215 at the third position, and may identify a defocus magnitude of a region of interest in the third image. The image signal processor 217 may search the memory 219 again for point spread function corresponding to the determined distance and may re-determine a defocus magnitude change of a region of interest in the second image and a region of interest in the third image and a defocus position corresponding to the determined amount of movement. The image signal processor 217 may re-determine an amount of movement from the re-determined defocus position to the focus position. The memory 219 may store a magnitude ratio between the specified point spread function and the other specified point spread function, instead of the other specified point spread function. The image signal processor 217 may generate a point spread function corresponding to the determined distance by using the magnitude ratio, at the time of performing the DFD operation using the second and third images. As described above, a focus error due to the DFD operation may be corrected by determining a distance of the subject by using specified point spread function and then re-determining the focus position by using the other point spread function corresponding to the determined distance.

According to an embodiment, the image signal processor 217 may identify a magnitude ratio between the specified point spread function and the other point spread function and may correct an amount of movement by multiplying the determined amount of movement by the identified magnitude ratio. When the determined distance of the subject is longer or greater than the specified distance corresponding to the specified point spread function, a specified point light source function may be smaller or less than a point spread function corresponding to the determined distance. A defocus magnitude change depending on the determined amount of movement may be smaller than a defocus magnitude change corresponding to the actual focus position. The image signal processor 217 may increase the determined amount of movement by a defocus magnitude ratio (e.g., a first correction value) of the calculated point spread function to the specified point spread function. The first correction value may be a result obtained by dividing the defocus magnitude of the point spread function corresponding to the determined distance by the defocus magnitude of the specified point spread function. When the determined distance of the subject is shorter than the specified distance corresponding to the specified point spread function, the point spread function corresponding to the determined distance may be larger in size than the specified point spread function. The image signal processor 217 may decrease the amount of movement by a magnitude ratio (e.g., a second correction value) of the point spread function corresponding to the determined distance to the specified point spread function. The second correction value may be a result obtained by dividing the defocus magnitude of the point spread function corresponding to the determined distance by the defocus magnitude of the specified point spread function. The first and second correction values may be experimentally determined based on a magnitude ratio of point spread function at the same lens position when the subject is in a close range and point spread function at the same lens position when the subject is in a long range. Accordingly, an error in the focus position due to the DFD operation may be reduced by correcting an amount of movement such that the amount of movement is proportional to a defocus magnitude change.

According to an embodiment, the image signal processor 217 may provide the determined amount of movement to the driving unit 213 to cause the driving unit 213 to move the lenses to the focus position. Then, the image signal processor 217 may obtain a focused image of the subject formed on the image sensor 215.

According to various embodiments, the memory 219 may store an amount of movement for moving from the calculated defocus position to the focus position, and the amount of movement may be obtained by correcting an error in an amount of movement due to a distance of the subject. For example, the memory 219 may store an amount of movement for moving from the first position to the second position, and the amount of movement may be determined such that a defocus magnitude change of an image formed on the image sensor 215 according to a unit movement (or a unit position change) of the lenses for at least a specified distance of the subject is equal to a specified magnitude change. The unit amount of movement may be stored in a lookup table form.

The amount of movement may be determined to correct nonlinearity of a defocus magnitude change depending on a distance change of the subject. The image signal processor 217 may search the memory 219 for an amount of movement corresponding to a defocus position determined through the DFD operation and may move the lenses by the discovered amount of movement. As described above, if an amount of movement for correcting nonlinearity of the focus position depending on a distance of the subject and a lens position is stored in the memory 219 and a defocus position is determined through a DFD operation, a focus adjustment error due to the DFD operation may be corrected through a simple process of searching the memory 219 for an amount of movement corresponding to the determined defocus position.

According to various embodiments, the driving unit 213 may move the lens unit 211 by a specified distance for each position of the lens unit 211. The specified distance may be set such that a defocus change of a specified magnitude is made by a unit movement of the lens unit 211 at each position of the lens unit 211. The image signal processor 217 may not separately correct the determined amount of movement. However, the driving unit 213 may move a different distance to correspond to the position of the lens unit 211. Accordingly, a defocus magnitude change due to a unit movement of the lens unit 211 may be equal to a specified magnitude change or may be within a specified error range from the defocus magnitude change.

According to various embodiments, the lens unit 211 may include a plurality of lens groups. The plurality of lens groups may include at least one focus lens that is moved along the optical axis by a force of the driving unit 213. Other lenses of the lens unit 211, except for the focus lens, may have a fixed form. The memory 219 may store point spread function for correcting a defocus magnitude change depending on the position of the focus lens and the distance of the subject and a magnitude ratio of the point spread function.

According to various embodiments, at least some of the functions performed by the image signal processor 217 may be performed by another processor (e.g., an application processor). For example, an operation of calculating an amount of movement by using a plurality of images and/or an operation of correcting the calculated amount of movement may be performed by another processor.

The focus of the camera module 210 may be accurately adjusted by determining an amount of movement to the focus position by using point spread function corresponding to a determined distance of the subject.

Figure 3:
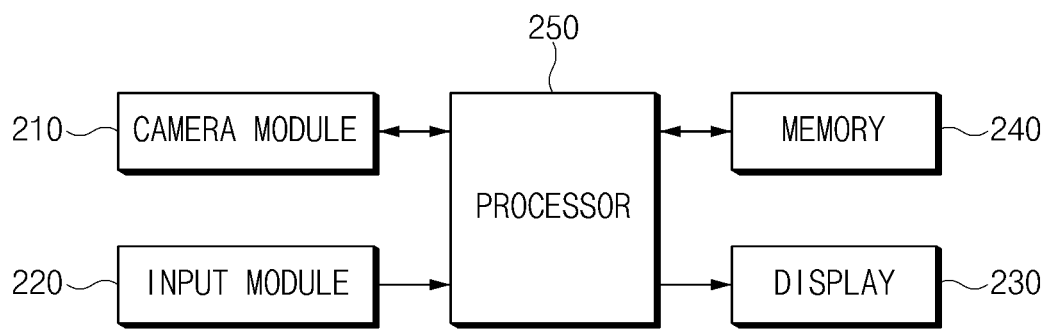
FIG. 3 is a diagram of an electronic device, according to an embodiment.

FIG. 3 is a diagram of an electronic device, according to an embodiment.

Referring to FIG. 3, an electronic device 20 may include the camera module 210, a display 230, an input module 220, a memory 240, and a processor 250 the image signal processor 217). Some elements may be omitted, or additional elements may be further included. Some of the elements may be combined together to form one object or module, but the object may identically perform the function of the corresponding elements before the combination.

According to an embodiment, the camera module 210 may further include a group of lenses and may move the group of lenses along an optical axis to adjust a focus. The driving unit 213 included in the camera module 210 may receive a control signal from the processor 250 and may move the lenses by an amount of movement depending on the control signal in a first direction toward a subject or in a second direction away from the subject.

The camera module 210 may move the lenses by the amount of movement corresponding to the control signal. The camera module 210 may move the lenses by a unit distance at a time over a total distance that the lenses are capable of moving along the optical axis to adjust the focus. The total distance may be divided into 1024 ($=2^{10}$) unit distances or 512 ($=2^9$) unit distances. At least some of the unit distances may be the same or differ from one another. For example, the camera module 210 may move the lenses by a first unit distance at a time in at least one section of the entire route along which the lenses are movable and may move the lenses by at least one second unit distance at a time in at least one other section of the entire route. The first unit distance and the second unit distance may be determined such that a defocus magnitude change of an image formed on the image sensor 215 due to a movement of the lenses is constant or within a specified error range.

According to an embodiment, the camera module 210 may transmit a preview image, among images formed on the image sensor 215, to the display 230 and may transmit a captured image to the processor 250.

The camera module 210 may transmit, to the processor 250, a plurality of preview images obtained at a plurality of lens positions at a specified time point. The specified time point may be a time point at which the camera module 210 performs a focus adjustment function. The camera module 210 may make a request to correct the amount of movement while transmitting, to the processor 250, a plurality of images obtained at the plurality of lens positions at the specified time point. The camera module 210 may receive a calculated amount of movement from the processor 250 and may adjust the lens position in response to the received amount of movement.

The display 230 may include an LCD, a light-emitting diode (LED) display, an organic light-emitting diode (OLED) display, or electronic paper display. The display 230 may display various types of contents (e.g., text, images, videos, icons, symbols, and/or the like) to a user. The display 230 may display at least one of a preview image received from the camera module 210 and an image taken by the camera module 210.

According to an embodiment, the input module 220 may receive a user input. The input module 220 may be a touch screen sensor. The input module 220 may detect or receive a first user input that makes a request to drive a camera or take an image.

The memory 240 may be a volatile memory (e.g., a RAM), a nonvolatile memory (e.g., a ROM, a flash memory, etc.), or a combination thereof. The memory 240 may store commands or data associated with at least one other element of the electronic device 20.

According to an embodiment, the memory 240 may store specified point spread functions corresponding to specified distances. Each position of the lens unit 211 may include all positions where the lens unit 211 is able to be moved by a force of the driving unit 213 and a movement margin interval. For example, the specified point spread function may include a plurality of degrees of spreading of a point which is modeled to correspond to a defocus magnitude of an image having obtained a point light source (unsaturated) spaced apart from the lens unit 211 by the specified distance from the image sensor 215 for each position of the entire route along which the lens unit 211 is movable. Alternatively, the specified point spread function may include a plurality of degrees of spreading of a point which is modeled to correspond to a defocus magnitude of a point light source which is spaced by the specified distance apart from each position where the lens unit 211 is able to be moved, through using a mathematical formula based on design data of the lens unit 211. The specified distance may be a distance of a subject that is able to be photographed by the camera module 210 and may be, for example, 2 m. The intervals (or the defocus magnitude changes) between the point spread function may be constant or nearly similar to one another.

The magnitudes (or intervals) of the point spread function may be calculated differently depending on each position of the lenses and a distance of the subject. For example, the magnitudes of the point spread function may be smallest when the lenses are at a focus position and may relatively increase as the lenses are away from the focus position. The magnitudes of point spread function identified from a first image of the distant subject and a second image of the close subject that are obtained while the position of the lens unit 211 is fixed may be relatively small when the subject is relatively close to the lens unit 211 and may be relatively large when the subject is relatively far away from the lens unit 211. The magnitude change of the point spread function depending on the distance between the lens unit 211 and the subject may lead to an error in the focus position according to the DFD operation. To prevent this, data for correcting the focus position according to the DFD operation may be additionally stored in the memory 240.

The memory 240 may additionally store another point spread function corresponding to another specified distance from the lens unit 211. For example, the other specified point spread function may include a plurality of degrees of spreading of a point which is modeled to correspond to a defocus magnitude of an image having obtained a point light source spaced apart from the lens unit 211 by the other specified distance from the image sensor 215 for each position of the entire route along which the lens unit 211 is movable. Alternatively, the other specified point spread function may include a plurality of degrees of spreading of a point which is modeled to correspond to a defocus magnitude relevant to of a point light source which is spaced by the other specified distance apart from each position where the lens unit 211 is able to be moved, through using a mathematical formula based on design data of the lens unit 211. The other specified point spread function may be configured as a plurality of sets depending on a distance of the subject.

The memory 240 may additionally store a magnitude ratio between the specified point spread function and the other specified point spread function. For example, the magnitude ratio may be determined through an experiment of identifying a defocus magnitude change depending on a distance of the subject while changing the distance of the subject in the state in which the position of the lens unit 211 is fixed. The magnitude ratio may be stored in a lookup table form in the memory 240.

According to an embodiment, the memory 240 may store an amount of movement that corresponds to a specified distance of the subject and each position of the lens unit 211. The amount of movement may be determined such that a defocus change of a specified magnitude is generated by a unit movement of the lens unit 211 for at least the specified distance of the subject. The amount of movement may be stored in a lookup table form, and the amount of movement may represent the number of pulses supplied to the driving unit 213.

The processor 250 may include a CPU, a GPU, a microprocessor, an application processor, an ASIC, and a FPGA and may have a plurality of cores. The processor 250 may perform operations or data processing associated with control and/or communication of at least one other element of the electronic device 20.

According to an embodiment, the processor 250 may extract a region of interest (or a subject) from an image obtained through the camera module 210 and may identify a defocus magnitude of the extracted region of interest. The processor 250 may identify the defocus magnitude of the region of interest while tracking the region of interest. In this process, the processor 250 may transmit an amount of movement to the camera module 210 to adjust the position of the lens unit 211.

According to an embodiment, the processor 250 may obtain two images of a subject from the camera module 210 at different lens positions. The processor 250 may locate the lens unit 211 at a first position and may obtain a first image of the subject from the camera module 210. In addition, the processor 250 may move the lens unit 211 by a specified amount of movement to locate the lens unit 211 at a second position and may obtain a second image of the subject from the camera module 210.

According to an embodiment, the image signal processor 250 may calculate a defocus position of a region of interest by performing a DFD operation based on the specified amount of movement and a difference between the obtained first and second images by using point spread function corresponding to a specified distance. Since the defocus position corresponds to the distance from the current position of the lens unit 211 to the focus position, the processor 250 may determine an amount of movement from the calculated defocus position to the focus position.

According to an embodiment, the processor 250 may determine the distance between the lens unit 211 and the subject by using the defocus position and may correct the determined amount of movement, based on the determined distance. Alternatively, the processor 250 may correct an error in the amount of movement due to a magnitude difference between the specified point spread function used in the DFD operation and point spread function corresponding to the determined distance.

According to an embodiment, the processor 250 may search the memory 240 again for the point spread function corresponding to the determined distance and may re-determine an amount of movement by using the discovered point spread function. For example, the processor 250 may move the lens unit 211 by the determined amount of movement by using the camera module 210 to locate the lens unit 211 at a third position and may obtain a third image from the camera module 210 at the third position. The processor 250 may identify a defocus magnitude of a region of interest in the third image. The processor 250 may search the memory 240 for the point spread function corresponding to the calculated distance and may re-determine a defocus position by an amount of movement determined using the discovered point spread function and the DFD operation based on a defocus magnitude difference between the region of interest in the second image and the region of interest in the third image.

The processor 250 may re-determine an amount of movement from the re-determined defocus position to the focus position. The memory 240 may store a magnitude ratio between the specified point spread function and the other specified point spread function. The processor 250 may generate a point spread function corresponding to the determined distance by using the magnitude ratio, at the time of performing the DFD operation using the second and third images. A focus error due to the DFD operation may be corrected by calculating a distance of the subject by using the specified point spread function and then re-determining the focus position by using the point spread function corresponding to the calculated distance.

According to an embodiment, the processor 250 may identify, from the memory 240, a magnitude ratio between the specified point spread function and the point spread function corresponding to the calculated distance and may correct an amount of movement by multiplying the determined amount of movement by the identified magnitude ratio. For example, when the determined distance is longer than the specified distance corresponding to the specified point spread function, a specified point light source function may be smaller than the point spread function corresponding to the determined distance. A defocus magnitude change depending on the determined amount of movement may be smaller or less than an actually-required defocus magnitude change. Accordingly, the processor 250 may increase the determined amount of movement by a defocus magnitude ratio (e.g., a first correction value) of the determined point spread function to the specified point spread function.

The first correction value may be, for example, a result obtained by dividing the defocus magnitude of the point spread function corresponding to the determined distance by the defocus magnitude of the specified point spread function. When the determined distance is shorter or less than the specified distance corresponding to the specified point spread function, the point spread function corresponding to the determined distance (or the calculated point spread function) may be larger or greater in size than the specified point spread function. The processor 250 may decrease the amount of movement by a magnitude ratio (e.g., a second correction value) of the point spread function corresponding to the determined distance to the specified point spread function.

The second correction value may be, for example, a result obtained by dividing the defocus magnitude of the point spread function corresponding to the determined distance by the defocus magnitude of the specified point spread function. The first and second correction values may be experimentally determined based on a magnitude ratio of a point spread function at the same lens position when the subject is in a close range and a point spread function at the same lens position when the subject is in a long range. Accordingly, an error in the focus position due to the DFD operation may be reduced by correcting an amount of movement such that the amount of movement is proportional to a defocus magnitude change.

According to an embodiment, the processor 250 may provide the determined amount of movement to the camera module 210. The camera module 210 may receive the amount of movement and may move the lenses depending on the amount of movement to adjust a focus for the subject.

According to various embodiments, the processor 250 may receive an image from the camera module 210 at a different lens position while directly controlling the driving unit 213 of the camera module 210 and may determine and correct an amount of movement, based on a defocus magnitude of the received image.

According to various embodiments, the memory 240 may store an amount of movement for correcting an error in an amount of movement due to a distance of the subject corresponding to a calculated defocus position. The amount of movement may be determined to correct nonlinearity of a defocus magnitude change depending on a change in the distance of the subject. The processor 250 may search the memory 240 for an amount of movement corresponding to a defocus position determined through the DFD operation and may move the lenses by the discovered amount of movement. As described above, if an amount of movement for correcting nonlinearity of the focus position depending on a distance of the subject and a lens position is stored in the memory 240 and a defocus position is determined through the DFD operation, a focus adjustment error due to the DFD operation may be corrected through a simple process of searching the memory 240 for an amount of movement corresponding to the determined defocus position.

According to various embodiments, the driving unit 213 of the camera module 210 may move the lens unit 211 by a specified distance for each position of the lens unit 211. The specified distance may be set such that a defocus change of a specified magnitude is made by a unit movement of the lens unit 211 at each position of the lens unit 211. The processor 250 may not separately correct the determined amount of movement. However, the driving unit 213 may move a different distance to correspond to the position of the lens unit 211. Accordingly, a defocus magnitude change due to a unit movement of the lens unit 211 may be equal to a specified magnitude change or may be within a specified error range from the defocus magnitude change.

Figure 4A:
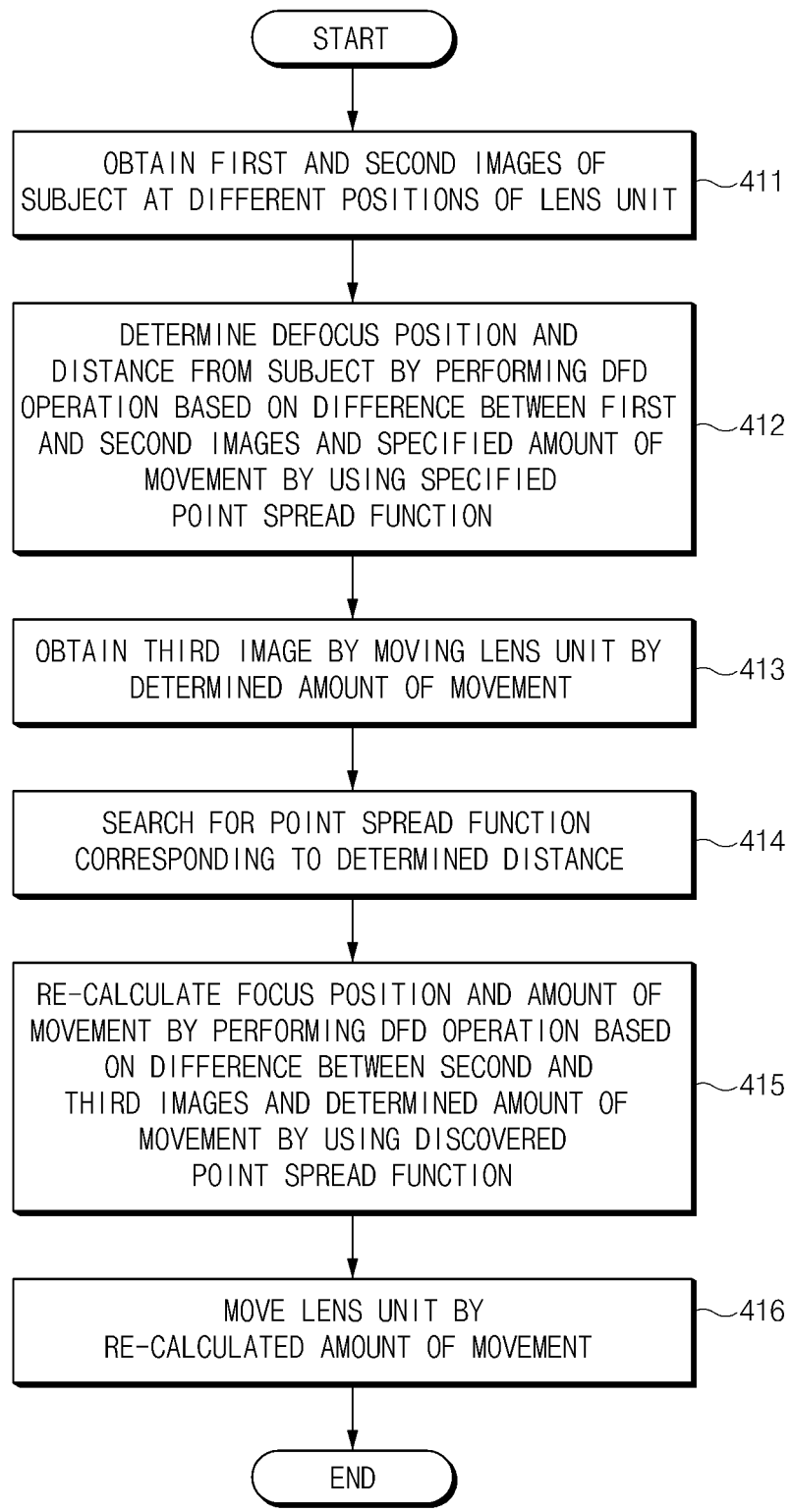
FIGS. 4A to 4C are flowcharts of focus adjustment methods, according to an embodiment.

FIG. 4A is a flowchart of a method for adjusting a focus, according to an embodiment. FIG. 4A illustrates an example of re-calculating a focus position by determining a distance from a subject through the DFD operation and then using point a spread function corresponding to the determined distance.

In step 411, the image signal processor 217 obtains, from the image sensor 215, a first image and a second image of a subject at different positions of the lens unit 211. For example, the image signal processor 217 may locate the lens unit 211 at a first position and may obtain the first image of the subject formed on the image sensor 215. In addition, the image signal processor 217 may move the lens unit 211 by a specified amount of movement to locate the lens unit 211 at a second position and may obtain the second image of the subject formed on the image sensor 215.

In step 412, the image signal processor 217 calculates a defocus position of the camera module 210 by performing the DFD operation based on a difference between the two obtained images and the specified amount of movement by using specified point spread function. The image signal processor 217 may determine an amount of movement for moving the lens unit 211 from the calculated defocus position to the focus position, and the image signal processor 217 may determine a distance from the subject, based on the focus position.

In step 413, the image signal processor 217 moves the lens unit 211 by the determined amount of movement by using the driving unit 213 to locate the lens unit 211 at a third position and obtains a third image of the subject formed on the image sensor 215, with the lens unit 211 located at the third position.

In step 414, the image signal processor 217 searches the memory 219 for point spread function corresponding to the determined distance.

In step 415, the image signal processor 217 re-calculates a focus position for the subject by performing the DFD operation based on a defocus magnitude difference between the second image and the third image and the determined amount of movement by using the point spread function corresponding to the determined distance.

In step 415, the image signal processor 217 determines an amount of movement from the current position of the lens unit 211 to the re-calculated focus position.

In step 416, the image signal processor 217 moves the lens unit 211 by the re-determined amount of movement by using the driving unit 213.

Figure 4B:
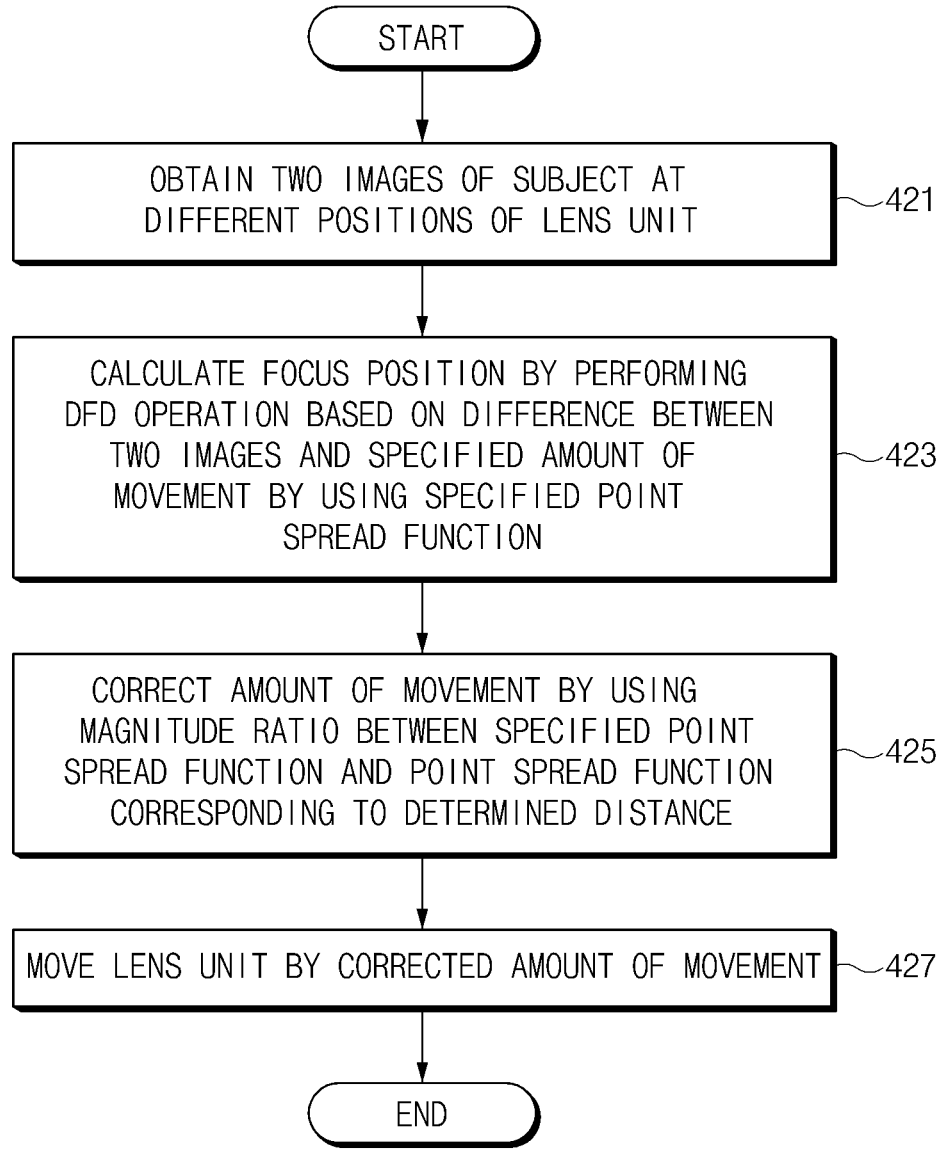

FIG. 4B is a flowchart of a method for adjusting a focus, according to an embodiment. FIG. 4B illustrates an example of correcting a focus position determined by the DFD operation, by using a magnitude ratio between a point spread function used in the DFD operation and a point spread function corresponding to a determined distance.

Referring to FIG. 4B, in step 421, the image signal processor 217 obtains, from the image sensor 215, two images of a subject at different positions of the lens unit 211. For example, the image signal processor 217 may locate the lens unit 211 at a first position and may obtain a first image of the subject formed on the image sensor 215. In addition, the image signal processor 217 may move the lens unit 211 by a specified amount of movement to locate the lens unit 211 at a second position and may obtain a second image of the subject formed on the image sensor 215, with the lens unit 211 located at the second position.

In step 423, the image signal processor 217 calculates a focus position of the camera module 210 by performing the DFD operation based on a difference between the two obtained images and the specified amount of movement by using specified point spread function. The image signal processor 217 may determine a distance from the subject by using the calculated focus position.

In step 425, the image signal processor 217 corrects an amount of movement corresponding to the defocus position by reflecting a magnitude ratio between a point spread function corresponding to the determined distance and the specified point spread function. For example, the image signal processor 217 may correct the determined amount of movement by performing an operation of dividing a defocus magnitude of the point spread function corresponding to the determined distance by a defocus magnitude of the specified point spread function and then multiplying the determined amount of movement by the result of step 425.

In step 427, the image signal processor 217 moves the lens unit 211 by the determined amount of movement by using the driving unit 213. The moved lens unit 211 may be located at the focus position.

Figure 4C:
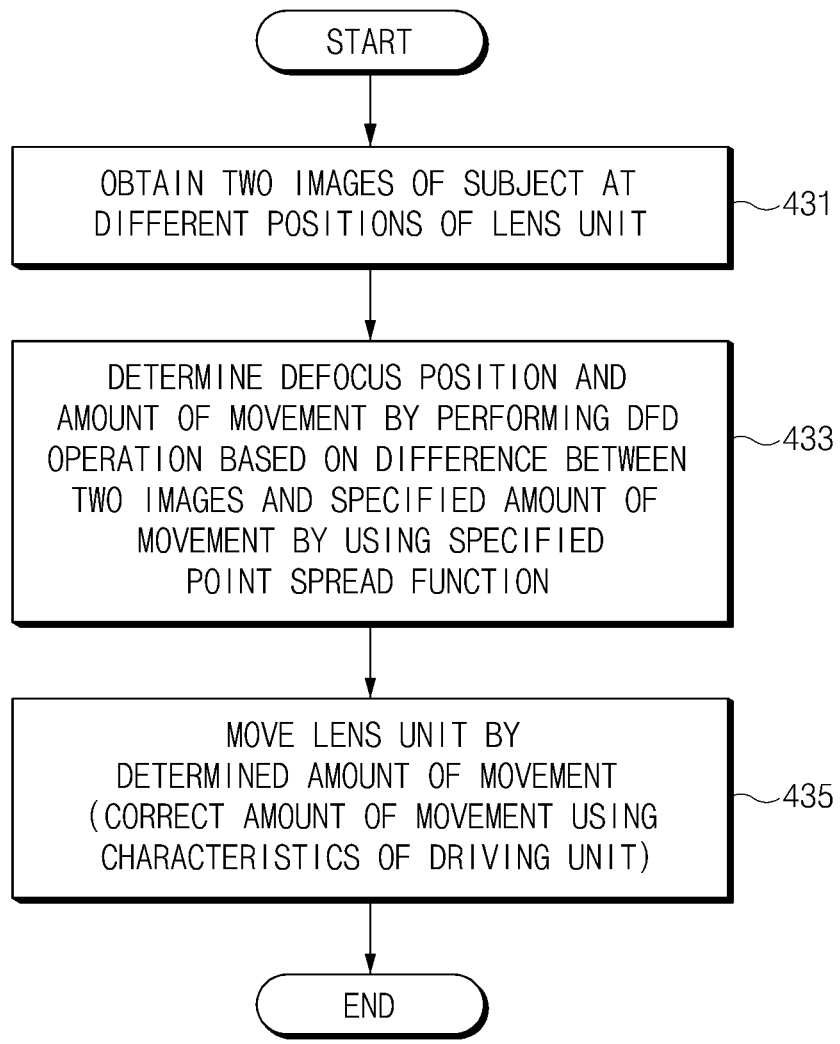

FIG. 4C is a flowchart of a method for adjusting a focus, according to an embodiment.

Referring to FIG. 4C, in step 431, the image signal processor 217 obtains, from the image sensor 215, two images of a subject at different positions of the lens unit 211. For example, the image signal processor 217 may locate the lens unit 211 at a first position and may obtain a first image of the subject formed on the image sensor 215. In addition, the image signal processor 217 may move the lens unit 211 by a specified amount of movement to locate the lens unit 211 at a second position and may obtain a second image of the subject formed on the image sensor 215, with the lens unit 211 located at the second position.

In step 433, the image signal processor 217 calculates a defocus position by performing the DFD operation based on a difference between the two obtained images and the specified amount of movement by using a specified point spread function. The image signal processor 217 may determine an amount of movement for moving the lens unit 211 from the defocus position to the focus position.

In step 435, the image signal processor 217 moves the lens unit 211 by the determined amount of movement by using the driving unit 213. The driving unit 213 may move the lens unit 211 by a specified moving distance for each position of the lens unit 211, and the amount of movement may be corrected due to driving characteristics of the driving unit 213. The specified moving distance may be set such that a defocus change of a specified magnitude is made by a unit movement of the lens unit 211 at each position of the lens unit 211. Accordingly, the driving unit 213 may correct an error in the focus position that is generated in the result of the DFD operation due to the characteristics of the driving unit 213 that is differently driven depending on the position of the lens unit 211.

Figure 5:
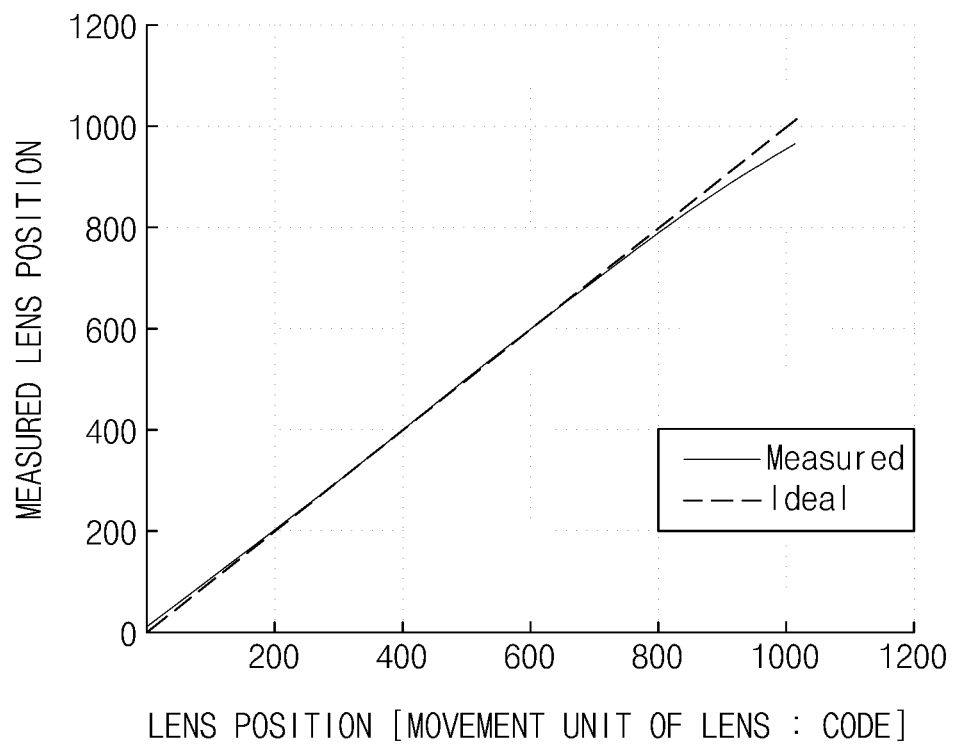
FIG. 5 is a graph of an error between a calculated lens position and an actual lens position of a camera module, according to an embodiment.

FIG. 5 is a graph of an error between a calculated lens position and an actual lens position of a camera module, according to an embodiment. In FIG. 5, the x-axis represents a movement unit of a lens, and the y-axis represents a measured lens position. The dotted line in FIG. 5 represents ideal lens positions that have to be measured at respective lens positions, and the ideal lens positions may linearly vary depending on a movement of the lens. The solid line in FIG. 5 represents measured lens positions. The measured lens positions may differ from the ideal lens positions due to various causes. The difference between the measured lens positions and the ideal lens positions may lead to an error in adjustment of a focus.

Figure 6:
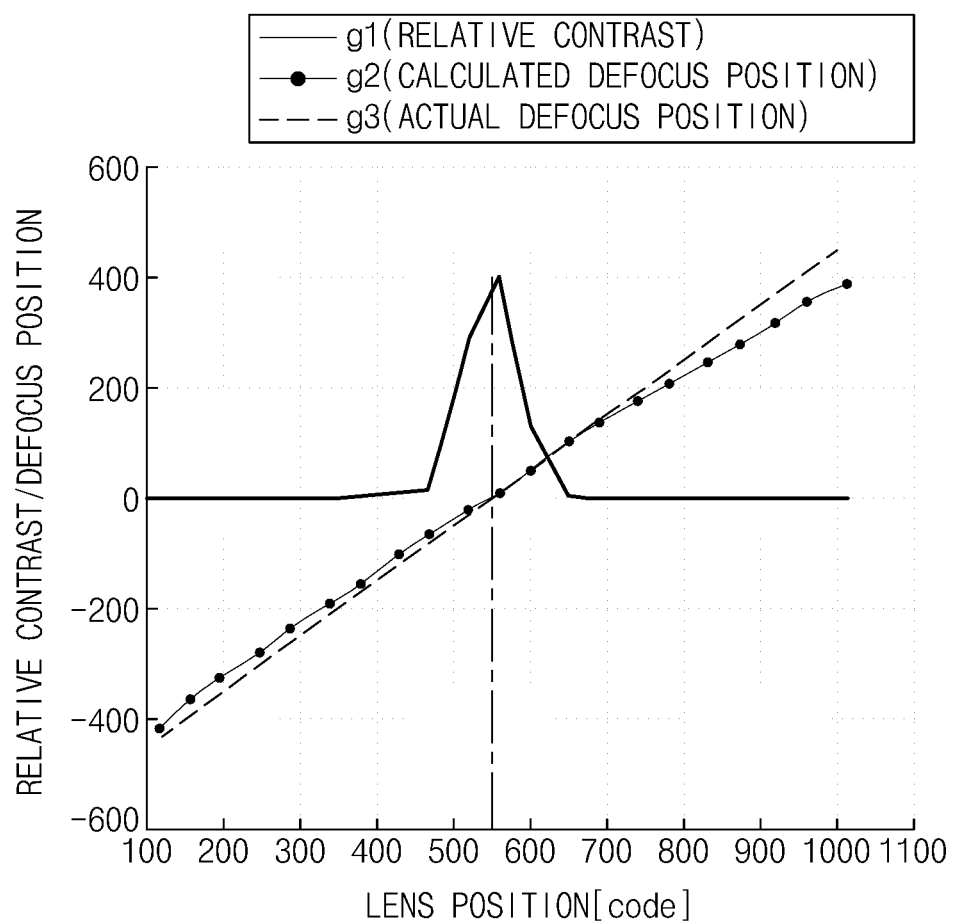
FIG. 6 is a graph depicting distances to a focus (or on-focus) position calculated at respective lens positions of a camera module by a DFD operation using point spread function corresponding to a specified distance, according to an embodiment.

FIG. 6 is a graph of distances to an on-focus position calculated at respective lens positions of a camera module by the DFD operation using a point spread function corresponding to a specified distance, according to an embodiment. The x-axis represents a movement unit of a lens, and the y-axis represents a calculated defocus position. The origin may correspond to an initial position of the lens (a state in which the lens is furthest from a subject). The lens may approach the subject with an increase in x- and y-values.

In FIG. 6, the solid line g1 represents relative contrast of an image, and the peak of the solid line may correspond to a focus position. The dotted line g3 represents ideal defocus positions of the lens at respective lens positions, and a defocus magnitude change may be proportional to a movement of the lens. The solid line g2 with circular points represents defocus positions calculated by the DFD operation.

Referring to FIG. 6, it can be seen that the defocus position calculated at the focus position or a lens position nearby the focus position approximately equals the actual focus position. Furthermore, it can be seen that the errors between the ideal defocus positions g3 and the calculated defocus positions g2 relatively increase as the lens approaches the subject or moves away from the initial position. The errors between the ideal defocus positions and the calculated defocus positions may increase with a change in the direction in which the lens moves or a repetition of the movement of the lens. The calculated error may differ from the ideal defocus positions due to various causes, such as nonlinearity of the driving unit 213, a distance from the subject, etc. For example, the errors may be generated due to the nonlinearity of the driving unit 213. The nonlinearity of the driving unit 213 may be generated since a unit distance by which the driving unit 213 is moved by the same number of pulses does not lead to the same defocus magnitude change; the errors may lead to an error in the focus position.

However, the camera module 210 may correct the calculated defocus positions by using the DFD operation. Accordingly, the camera module 210 may correct the errors between the calculated defocus positions and the actual defocus positions in FIG. 6.

Figure 7:
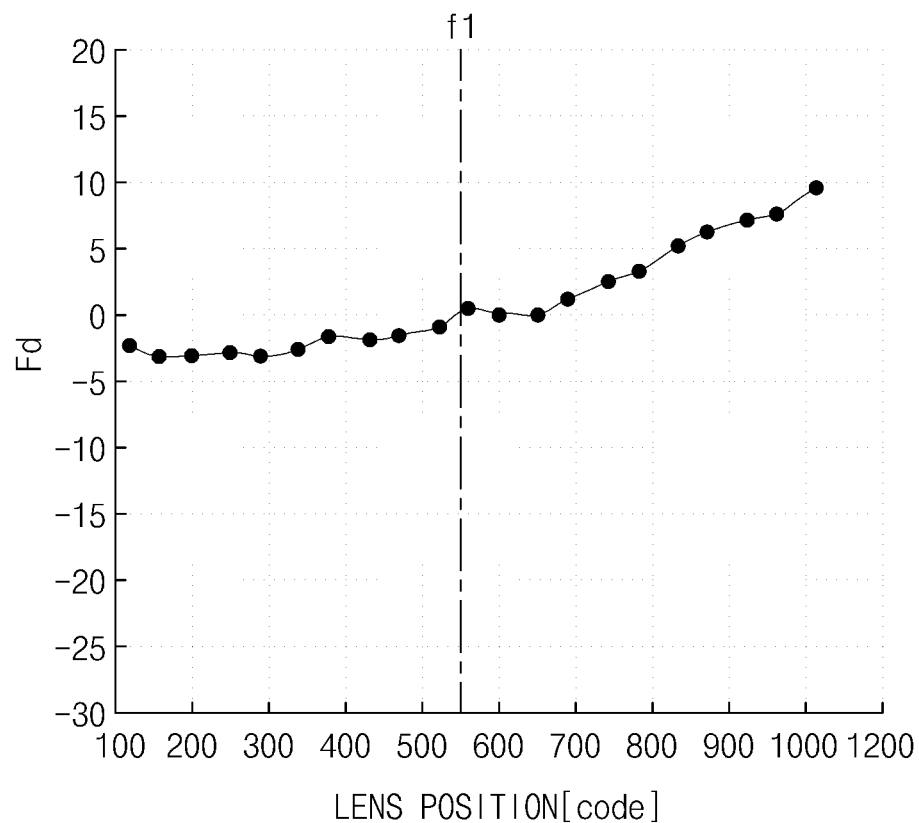
FIG. 7 is a graph of errors between actual defocus positions and calculated defocus positions, according to an embodiment.

FIG. 7 is a graph of errors between actual defocus positions and calculated defocus positions, according to an embodiment. The x-axis represents a lens position, the y-axis represents an error value, and Fd is the unit of the error.

Referring to FIG. 7, the defocus position calculated from an image obtained at the focus position f1 approximately agrees with the actual defocus position, whereas the errors between the defocus positions calculated through a DFD operation and the actual defocus positions increase as the lens position is away from the focus position f1. However, according to an embodiment, an error in the focus position depending on a lens position and a distance from a subject may be corrected, and thus the errors due to the DFD operation may be corrected.

Figure 8:
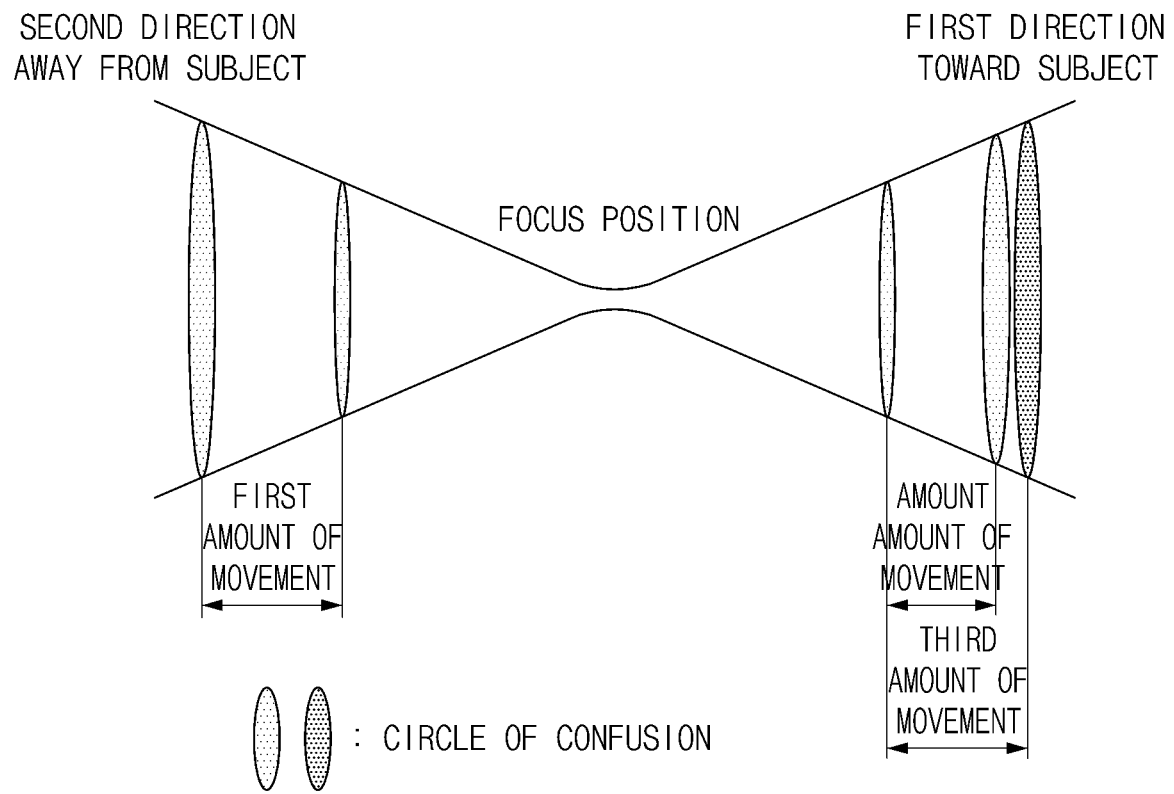
FIG. 8 is a diagram of a defocus magnitude change depending on a lens position, according to an embodiment.

FIG. 8 is a diagram of a defocus magnitude change depending on a lens position, according to an embodiment. In FIG. 8, a first direction (near direction) represents a moving direction toward a subject, and a second direction (far direction) represents a moving direction away from the subject.

Referring to FIG. 8, a first amount of movement in the first direction and a second amount of movement in the second direction may lead to different defocus changes. For example, the first amount of movement and the second amount of movement may be values for moving the lens of the camera module 120 by different distances. A defocus change (represented by a dotted ellipse) due to the first amount of movement (defocus (Df) code) in the first direction may be greater than a defocus change due to the second amount of movement in the second direction. However, the camera module 210 may apply a third amount of movement when moving the lens in the first direction and may apply the first amount of movement when moving the lens in the second direction, thereby improving an error in the DFD operation due to nonlinearity between a distance from the subject and a movement of the lens. The third amount of movement may cause the same defocus magnitude change as the first amount of movement.

Figure 9:
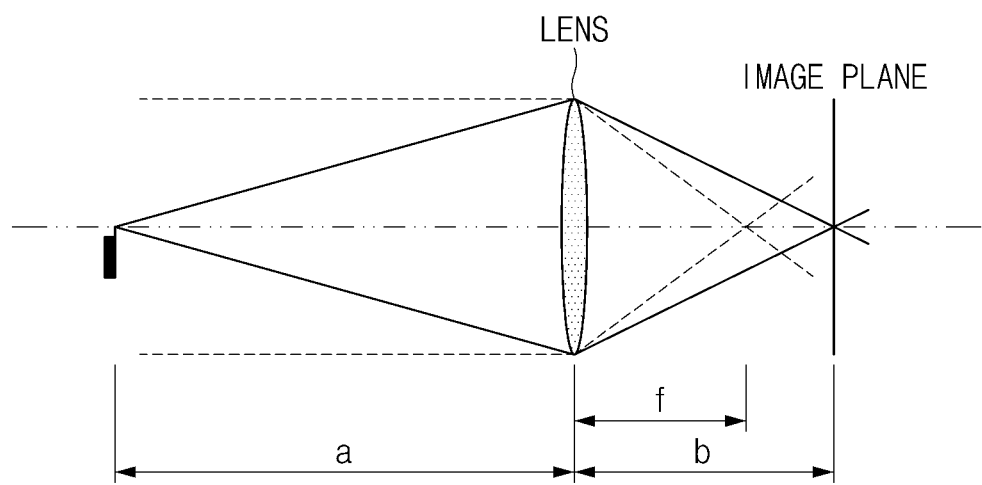
FIG. 9 is a diagram of a focus position of a camera module including a group of lenses depending on a distance from a subject, according to an embodiment.

FIG. 9 is a diagram of a focus position of a camera module including a group of lenses depending on a distance from a subject, according to an embodiment. In FIG. 9, a rectangle represents the position of the subject, "a" represents the distance between a lens and the subject, "b" represents the distance between the lens and an image plane, and "f" represents a focal length.

According to the lens formula, the distance "b" between the lens and the image plane may have a relationship with the focal length "f" and the distance "a" between the lens and the subject as shown in Eq. (1) below.

$$b = \frac{af}{a-f} \qquad (1)$$

Eq. 1 above shows that the distance "b" between the lens and the image plane varies depending on the distance "a" from the subject.

Figure 10:
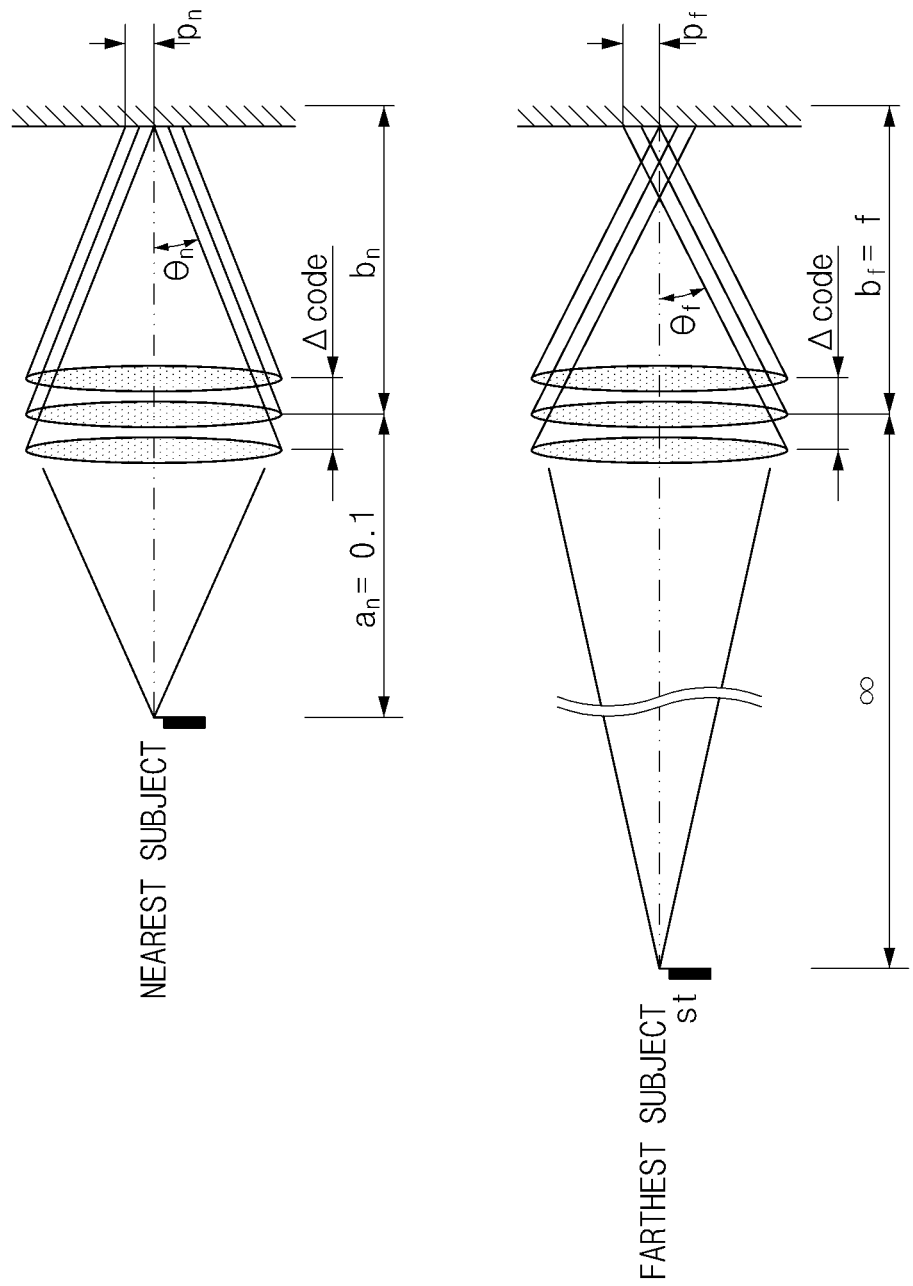
FIG. 10 is a diagram of a defocus magnitude change depending on a distance from a subject, according to an embodiment.

FIG. 10 is a diagram of a defocus magnitude change depending on a distance from a subject, according to an embodiment. FIG. 10 illustrates a defocus magnitude change $P_n$ when the subject is nearest a lens and a defocus magnitude change Pf when the subject is furthest from the lens. In FIG. 10, the focal length is 5 mm and the furthest distance is assumed to be infinite (∞). In FIG. 10, Δcode may be an amount of movement of the camera module 210. $θ_n$ may be the maximum incidence angle of light incident on an image sensor when the subject is near the lens, and $θ_f$ may be the maximum incidence angle of light incident on the image sensor when the subject is far away from the lens.

Referring to FIG. 10, by substituting the shortest distance an from the subject into Eq. (1), the defocus magnitude change $P_n$ at the shortest distance $a_n$ may be calculated as shown on the left side of Eq. (2) below. When the longest distance of from the subject is substituted into Eq. (1), the defocus magnitude change $P_f$ at the longest distance $a_f$ may be equal to the focal length.

$$P_n = \frac{a_n f}{a_n - f} \quad (2)$$

$$P_f = f$$

If the shortest distance $a_n$ is equal to 0.1 cm, the defocus magnitude change at the shortest distance may be calculated as shown in Eq. (3) below.

$$P_n = \frac{0.1 f}{0.1 - f} \quad (4)$$

$$P_f = f$$

There may be an about 5% difference in the defocus magnitude change depending on the distance from the subject, as shown in Eq. (4) below. The difference may lead to an error in a focus position.

$$\frac{P_n}{P_f} = \frac{0.1}{0.1 - f} \cong 105(\%) \quad (4)$$

The camera module 210 may reduce the calculated error in the focus position by using a method of re-calculating a defocus position by differently selecting a point spread function depending on a determined distance, a method of correcting a calculated defocus position by an error in a determined distance, and/or a method of correcting a defocus position by using a correction value corresponding to a distance determined at each lens position.

Figure 11:
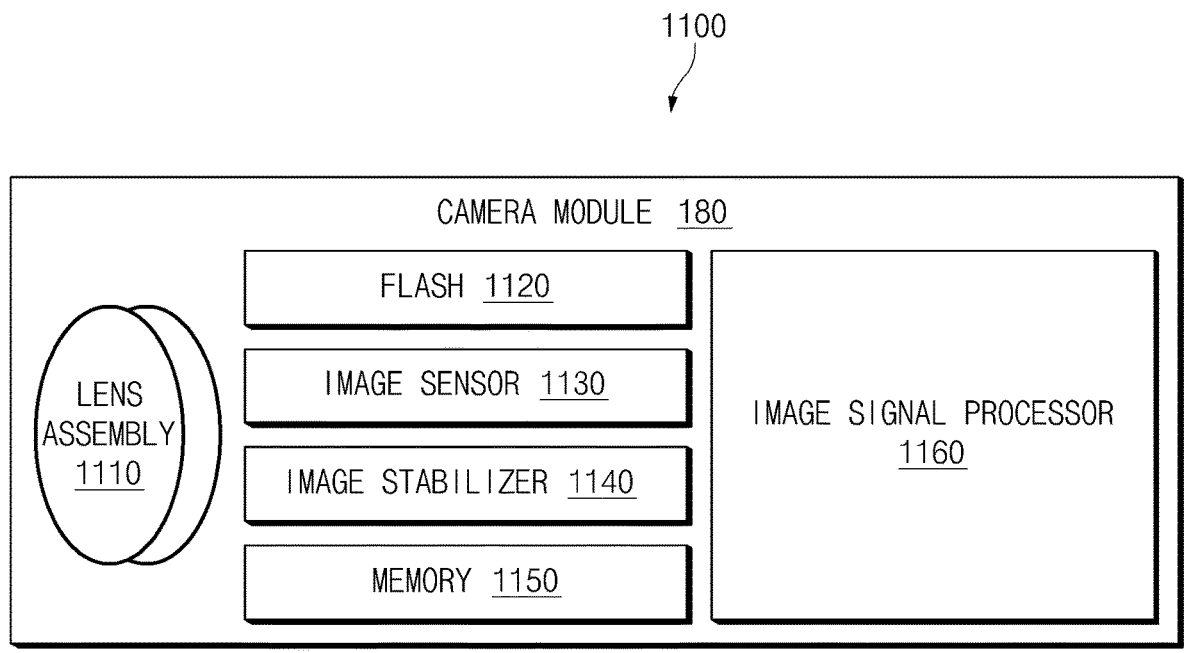
FIG. 11 is a diagram of a camera module, according to an embodiment.

FIG. 11 is a diagram 1100 of a camera module 180, according to an embodiment. The camera module 180 may include a lens assembly 1110, a flash 1120, an image sensor 1130, an image stabilizer 1140, memory 1150 (e.g., buffer memory), or an image signal processor 1160. The camera module 180 may also include some or all of the components of the cameral module 210 of FIG. 2.

The lens assembly 1110 may collect light emitted or reflected from an object whose image is to be taken, and the lens assembly 1110 may include one or more lenses. The camera module 180 may include a plurality of lens assemblies 1110. The camera module 180 may form a dual camera, a 360-degree camera, or a spherical camera. Some of the plurality of lens assemblies 1110 may have the same lens attribute (e.g., view angle, focal length, auto-focusing, f number, or optical zoom), or at least one lens assembly may have one or more lens attributes different from those of another lens assembly. The lens assembly 1110 may include a wide-angle lens or a telephoto lens.

The flash 1120 may emit light that is used to reinforce light reflected from an object. The flash 1120 may include one or more LEDs (e.g., an RGB LED, a white LED, an infrared (IR) LED, or an ultraviolet (UV) LED) or a xenon lamp. The image sensor 1130 may obtain an image corresponding to an object by converting light emitted or reflected from the object and transmitted via the lens assembly 1110 into an electrical signal. The image sensor 1130 may include one selected from image sensors having different attributes, such as a RGB sensor, a black-and-white sensor, an IR sensor, or a UV sensor, a plurality of image sensors having the same attribute, or a plurality of image sensors having different attributes. Each image sensor included in the image sensor 1130 may be implemented using, for example, a CCD sensor or a (CMOS sensor.

The image stabilizer 1140 may move the image sensor 1130 or at least one lens included in the lens assembly 1110 in a particular direction, or control an operational attribute (e.g., adjust the read-out timing) of the image sensor 1130 in response to the movement of the camera module 180 or the electronic device 101 including the camera module 180; this allows compensating for at least part of a negative effect (e.g., image blurring) by the movement on an image being captured. The image stabilizer 1140 may sense such a movement by the camera module 180 or the electronic device 101, which may include the camera module 180 in addition to the camera module 211) using a gyro sensor or an acceleration sensor disposed inside or outside the camera module 180. The image stabilizer 1140 may be implemented as an optical image stabilizer.

The memory 1150 may store, at least temporarily, at least part of an image obtained via the image sensor 1130 for a subsequent image processing task. If image capturing is delayed due to shutter lag or multiple images are quickly captured, a raw image obtained (e.g., a Bayer-patterned image, a high-resolution image) may be stored in the memory 1150, and its corresponding copy image (e.g., a low-resolution image) may be previewed via the display device 160. Thereafter, if a specified condition is met (e.g., by a user's input or system command), at least part of the raw image stored in the memory 1150 may be obtained and processed by the image signal processor 1160. The memory 1150 may be configured as at least part of the memory 130 or as a separate memory that is operated independently from the memory 130.

The image signal processor 1160 may perform one or more image processing with respect to an image obtained via the image sensor 1130 or an image stored in the memory 1150. The one or more image processing may include depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1160 may control (e.g., exposure time or read-out timing) with respect to at least one (e.g., the image sensor 1130) of the components included in the camera module 180. An image processed by the image signal processor 1160 may be stored in the memory 1150 for further processing, or may be provided to an external component (e.g., the memory 130, the display device 160, the electronic device 102, the electronic device 104, or the server 108) outside the camera module 180. The image signal processor 1160 may be configured as at least part of the processor 120, or as a separate processor that is operated independently from the processor 120. If the image signal processor 1160 is configured as a separate processor from the processor 120, at least one image processed by the image signal processor 1160 may be displayed, by the processor 120, via the display device 160 as it is or after being further processed.

An electronic device (e.g., the electronic device 20 of FIG. 2) includes a camera device (e.g., the camera module 210 of FIG. 2) including a lens unit (e.g., the lens unit 211 of FIG. 2) and a lens driving unit (e.g., the driving unit 213 of FIG. 2) configured to move the lens unit; and a processor (e.g., the processor 213 of FIG. 2, or the processor 250 of FIG. 3). The processor is configured to obtain a first image of an external object from the camera; move the lens unit by a specified amount of movement by using the lens driving unit; obtain a second image of the external object that corresponds to a position to which the lens unit is moved; determine a focus position for an image of the external object, based on a difference between the first image and the second image and the specified amount of movement; determine an amount of movement for moving the lens unit to the focus position, wherein the processor is configured to determine a distance between the external object and the lens unit and to correct the determined amount of movement based on the determined distance, as a part of an operation of determining the amount of movement; and move the lens unit by the determined amount of movement by using the lens driving unit.

The processor is configured to obtain a third image of the external object that corresponds to the determined amount of movement and to re-determine a focus position of the lens unit for the external object, based on a difference between the second image and the third image and the determined amount of movement, in a process of correcting the amount of movement based on the determined distance.

The electronic device further includes a memory (e.g., the memory 219 of FIG. 2 or the memory 240 of FIG. 3) configured to store a first point spread function, wherein the first point spread function are modeled to correspond to point light sources which is spaced by a specified distance apart from the lens unit at positions to which the lens unit moves, respectively.

The processor is configured to perform a depth from defocus (DFD) operation based on the difference between the first image and the second image and the specified amount of movement by using the first point spread function; determine the focus position for the external object through the DFD operation; and determine the distance between the external object and the lens unit.

The memory is configured to additionally store a second point spread function corresponding to the determined distance, and wherein the processor is configured to move the lens unit by the determined amount of movement by using the lens driving unit and obtain a third image of the external object from the camera, in the process of correcting the amount of movement based on the determined distance; re-determine a focus position of the lens unit for the external object by performing a DFD operation based on a difference between the second image and the third image and the determined amount of movement by using the second point spread function; and determine the corrected amount of movement for moving the lens unit to the re-determined focus position.

The memory is configured to additionally store a correction value for correcting a difference in magnitude between the first point spread function, and the second point spread function, and wherein the processor is configured to correct the determined amount of movement by using the correction value, in the process of correcting the amount of movement based on the determined distance.

The lens driving unit is configured to move the lens unit to each position of the lens unit by a specified moving distance, and the specified moving distance is set to generate a defocus change of a specified magnitude by a unit movement of the lens unit at each position of the lens unit.

An electronic device (electronic device 20 of FIG. 3) includes a camera (the camera module 210 of FIG. 2) including a lens unit (the lens unit 211 of FIG. 2) and a lens driving unit (the lens driving unit 213 of FIG. 2) configured to move the lens unit, wherein the lens driving unit has a difference between a first distance by which the lens unit is moved to cause specified defocus when the lens unit is located at a first position and a second distance by which the lens unit is moved to cause the specified defocus when the lens unit is located at a second position, in at least one section of the entire route along which the lens unit is moved; and a processor (the processor 217 of FIG. 2 or the processor 250 of FIG. 3). The processor is configured to obtain a first image of an external object from the camera; move the lens unit by a specified amount of movement by using the lens driving unit; obtain a second image of the external object that corresponds to a position to which the lens unit is moved; determine a focus position for an image of the external object, based on a difference between the first image and the second image and the specified amount of movement; determine an amount of movement for moving the lens unit to the focus position and correct the amount of movement, based on the difference between the first distance and the second distance, as a part of an operation of determining the amount of movement when the focus position is included in the at least one section of the route; and move the lens unit by the corrected amount of movement by using the lens driving unit.

The electronic device further includes a memory (e.g., the memory 219 of FIG. 2 or the memory 240 of FIG. 3) configured to store a first point spread function, wherein the first point spread function are modeled to correspond to point light sources spaced a specified distance apart from the lens unit at positions to which the lens unit moves, respectively, wherein the processor is configured to perform a depth from defocus (DFD) operation based on the difference between the first image and the second image and the specified amount of movement by using the first point spread function; determine the focus position for the external object through the DFD operation; determine the amount of movement for moving the lens unit to the focus position; and determine a distance between the external object and the lens unit and correct the determined amount of movement, based on the determined distance, as a part of the operation of determining the amount of movement.

The memory is configured to additionally store a second point spread function corresponding to the determined distance, and wherein the processor is configured to move the lens unit by the determined amount of movement by using the lens driving unit and obtain a third image of the external object from the camera, in the process of correcting the amount of movement; re-determine a focus position of the lens unit for the external object by performing a DFD operation based on a difference between the second image and the third image and the determined amount of movement by using the second point spread function; and determine the corrected amount of movement for moving the lens unit to the re-determined focus position.

The memory is configured to additionally store a correction value for correcting a difference in magnitude between the first point spread function and the second point spread function, and wherein the processor is configured to correct the determined amount of movement by using the correction value, in the process of correcting the amount of movement.

The lens driving unit is configured to move the lens unit to each position of the lens unit by a specified moving distance, and the specified moving distance is set to generate a defocus change of a specified magnitude by a unit movement of the lens unit at each position of the lens unit.

A camera module (the camera module 210 of FIG. 2) includes a lens unit (the lens unit 211 of FIG. 2) including a plurality of lenses; an image sensor (the image sensor 215 of FIG. 2) on which an image corresponding to light passing through the plurality of lenses is focused; a driving unit (the driving unit 213 of FIG. 2) configured to adjust a position of the lens unit, wherein the driving unit is configured to move the position of the lens unit by a first distance unit in at least one section of the entire route along which the lens unit is moved and to move the position of the lens unit by at least one second distance unit in at least one other section of the entire route, and the first distance unit and the second distance unit are determined such that defocus of the image formed on the image sensor is changed by a specified magnitude, or in a specified error range from the specified magnitude, by the unit movement of the lens unit; a processor (the image signal processor 217 of FIG. 2); and a memory (the memory 219 of FIG. 2) configured to store a first point spread function generated based on a defocus magnitude of an image having obtained a point light source spaced a specified distance apart from the lens unit according to a characteristic of the lens unit. The processor is configured to obtain a first image of an external object at a first position of the lens unit; move the lens unit by a specified amount of movement by using the driving and obtain a second image of the external object at a second position of the lens unit; calculate a defocus position for the external object by comparing a defocus magnitude change of the first point spread function, the specified amount of movement, and a defocus magnitude change between the first image and the second image; determine an amount of movement for moving the lens unit from the calculated defocus position to a focus position by using the driving unit; and move the lens unit by the determined amount of movement.

The processor is configured to calculate a distance between the lens unit and the external object that corresponds to the focus position; and correct the amount of movement, based on the calculated distance.

The memory is configured to additionally store a magnitude ratio between the first point spread function and a second point spread function corresponding to the calculated distance at each position of the lens unit, and wherein the processor is configured to correct the determined amount of movement by performing a specified operation using the determined amount of movement and the magnitude ratio.

The memory is configured to additionally store a second point spread function generated based on a defocus magnitude of an image having obtained a point light source spaced apart from the lens unit by the calculated distance, and wherein the processor is configured to re-calculate the focus position by using the second point spread function and to determine an amount of movement corresponding to the re-calculated focus position.

The driving unit is configured to move the lens unit to each position of the lens unit by a specified distance, and the specified distance is set to generate a defocus change of a specified magnitude by a unit movement of the lens unit at each position of the lens unit.

The electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

According to embodiments of the present disclosure, it is possible to reduce an error in a focus position determined by a DFD operation.

At least a part of an apparatuses (e.g., modules or functions thereof) or a methods (e.g., operations) described herein may be implemented by instructions stored in a non-transitory computer-readable storage medium in the form of a program module. The instructions, when executed by one of the aforementioned processors, may cause the processors to perform a function corresponding to the instructions. The non-transitory computer-readable storage medium may be the memory 130.

The non-transitory computer-readable recording medium may include a hard disk, a floppy disk, a magnetic media (e.g., a magnetic tape), an optical media (e.g., a compact disc ROM (CD-ROM) and a DVD, a magneto-optical media (e.g., a floptical disk)), and hardware devices (e.g., a ROM, a RAM, or a flash memory). Also, a program instruction may include not only a mechanical code such as generated by a compiler but also a high-level language code executable on a computer using an interpreter. The above hardware unit may be configured to operate via one or more software modules for performing an operation, and vice versa.

A module or a program module a may include at least one of the above elements, or a part of the above elements may be omitted, or additional other elements may be further included. Operations performed by a module, a program module, or other elements may be executed sequentially, in parallel, repeatedly, or in a heuristic method. In addition, some operations may be executed in different sequences or may be omitted. Alternatively, other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device, comprising:
 a camera including a lens unit and a lens driving unit configured to move the lens unit;
 a memory configured to store a plurality of point spread functions each corresponding to a respective distance between the lens unit and an external object, wherein a magnitude of each point spread function is calculated depending on the position of the lens unit and the relevant respective distance; and
 a processor configured to:
  obtain a first image of an object from the camera;
  move the lens unit by a first amount of movement using the lens driving unit;

obtain a second image of the object that corresponds to a position to which the lens unit is moved;

perform a first depth from defocus (DFD) operation based on a difference between the first image and the second image and the first amount of movement using a first point spread function among the plurality of point spread functions to determine a first focus position for the object;

determine a second amount of movement for moving the lens unit to the first focus position including determining a distance between the object and the lens unit;

move the lens unit by the second amount of movement using the lens driving unit;

obtain a third image of the object from the camera;

determine a second point spread function among the plurality of point spread functions corresponding to the determined distance;

perform a second depth from focus (DFD) operation based on a difference between the second image and the third image and the second amount of movement using the second point spread function to determine a second focus position for the object;

determine a third amount of movement for moving the lens unit to the second focus position; and move the lens unit by the third amount of movement using the lens driving unit.

2. The electronic device of claim 1, wherein the memory is further configured to additionally store a correction value for correcting a difference in magnitude between the first point spread function and the second point spread function, and wherein the processor is further configured to correct the second amount of movement or the third amount of movement using the correction value.

3. The electronic device of claim 1, wherein the lens driving unit is further configured to move the lens unit to each position of the lens unit by a specified moving distance, and the specified moving distance is set to generate a defocus change of a specified magnitude by a unit movement of the lens unit at each position of the lens unit.

* * * * *